United States Patent [19]

Pool

[11] 4,369,486

[45] Jan. 18, 1983

[54] ILLUMINATED FISHING TACKLE

[76] Inventor: Robert R. Pool, 607 E. Franklin, Mesa, Ariz. 85204

[21] Appl. No.: 256,840

[22] Filed: Apr. 23, 1981

[51] Int. Cl.³ .............................................. F21V 7/09
[52] U.S. Cl. ...................................... 362/32; 362/120; 362/183; 362/194; 362/217
[58] Field of Search .................. 362/32, 109, 119, 120, 362/183, 194 TS, 217

[56] References Cited

U.S. PATENT DOCUMENTS

| | | | |
|---|---|---|---|
| 791,713 | 6/1905 | McCarthy | 362/152 |
| 2,485,087 | 10/1949 | Diamond | 362/32 X |
| 2,791,676 | 5/1957 | Cote | 362/119 |
| 3,068,739 | 12/1962 | Hicks, Jr. et al. | 362/32 X |
| 3,890,497 | 6/1975 | Rush | 362/32 X |
| 4,085,437 | 4/1978 | Hrdlicka et al. | 362/109 |
| 4,118,882 | 10/1978 | Gorsky | 362/109 |
| 4,178,712 | 12/1979 | Williams | 362/194 X |
| 4,234,910 | 11/1980 | Price | 362/32 |
| 4,302,797 | 11/1981 | Cooper | 362/32 X |

Primary Examiner—Peter A. Nelson
Attorney, Agent, or Firm—Don J. Flickinger

[57] ABSTRACT

A fishing pole has a bulb in the handle for lighting a fiber optic bundle carried within the rod. Electrical energy is supplied to the bulb by a conductor communicating between a connector in the handle and a battery remote from the fishing pole. The battery may be held in a case affixed to a selected object and supporting a fishing pole holder. A bulb, within the case and energized by the battery, emits light through a window in the case.

37 Claims, 11 Drawing Figures

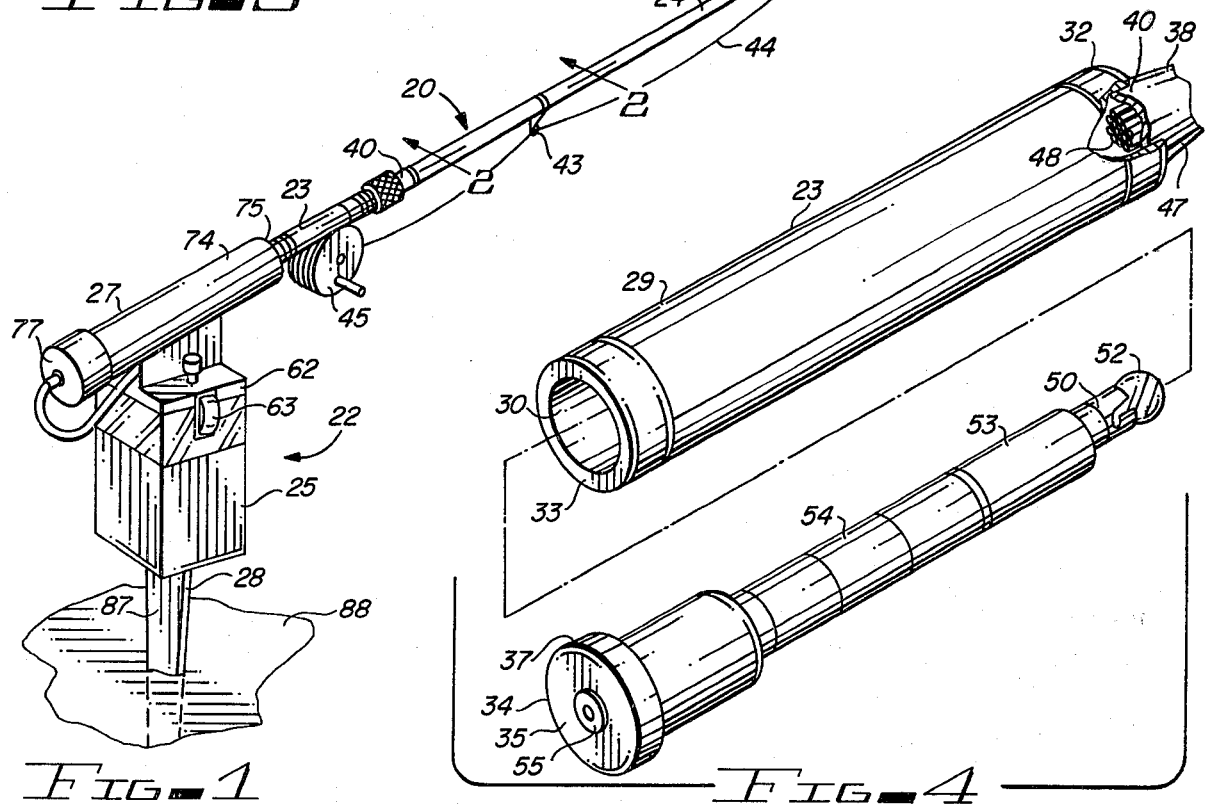

ILLUMINATED FISHING TACKLE

FIELD OF THE INVENTION

This invention relates to fishing tackle.

More particularly, the instant invention relates to fishing poles and accessories therefor.

In a further aspect, the immediate invention concerns light producing means for use in combination with fishing tackle.

PRIOR ART

Many species of fish are nocturnal, feeding primarily between sunset and sunrise. Other species, depending upon atmospheric conditions, birhythmic cycles and other factors, periodically engage in feeding at night. Accordingly, it is common practice for fisherman to indulge their sport during the hours of darkness.

Fishing at night requires tackle and accessories in addition to the fisherman's usual array. Without benefit of sunlight, for example, artificial illumination means are required for rummaging through the usually overfull tackle box; affixing lures, hooks and bait to the line, and performing the numerous other ancillary functions. Such illumination is usually provided by self-contained portable structures such as a lantern or flashlight.

Frequently, the fisherman does not physically hold his fishing pole. When still fishing, or trolling, it is common practice for the angler to rest or brace his pole by any immediately available expendiency or by use of a device commercially produced especially for the purpose. The fisherman then attends to other activities or simply relaxes while keeping an eye on the pole for movement indicating the presence of potential quarry.

The foregoing tactic is successful only to the degree that the angler can detect telltale movement, grasp the pole and set the hook on a timely basis. At night, the ploy is impeded by the fisherman's inability to properly observe the fishing pole. Light from a lantern or a flashlight may be entrained upon the pole. However, to do so is considered cumbersome and may require the production of a light which the angler may not otherwise desire.

As a remedy, the prior art has produced a relatively small highly audible bell having a clip for attachment to the pole near the free end. The twitching of the pole, in response to a fish examining the bait, causes the bell to ring. However, a fish which slowly tugs upon the bait fails to set off the alarm. Further, the bells are frequently flung off into the night and lost as the fisherman frantically jerks the pole to set the hook.

As an improvement, the prior art has proposed various fishing poles with integral illumination means. The typical lighted fishing pole includes a transparent or translucent rod containing one or more optical fibers which mutually terminate near the fixed end of the rod. A bulb, located near the juncture of the rod and the handle and energized by several flashlight batteries carried within the hollow handle, directs light to the end of the fiber optic bundle. The several optical fibers terminate at spaced locations along the pole. A similar device incorporates a single fiber having scrapes at various intervals.

In concept, the illuminated fishing pole provides a solution to a dilemma of the night fisherman. Twitches, bending or other movement of the fishing pole is easily discerned. However, as a practical matter, presently known prior art illuminated fishing poles provide less than a satisfactory resolution. Carrying batteries within the handle of the fishing pole increases the weight thereof and acts to destroy the inherent balance. The batteries are of the conventional flashlight type, usually C or D size. By empirical observation, the batteries and the matching bulb have a service life of approximately two hours.

Other inherent limitations are also noted. State of the art fishing poles of the immediate type are especially contrived devices requiring numerous manufacturing intricacies. The task of changing the bulb, for example, is a laborious task generally requiring at least partial disassembly of the fishing pole. Present schemes are devoid of universality which would suggest retrofit to pre-existing fishing poles. Further, the devices are exceedingly single purposed. That is, the batteries and the bulb illuminate only the pole and are not available for the fisherman's other needs.

It would be highly advantageous, therefore, to remedy the foregoing and other deficiencies ingrained in the prior art.

Accordingly, it is an object of the present invention to provide improved illumination means for fishing tackle.

Another object of the invention is the provision of an improved illuminated fishing pole.

Another object of the invention is to provide an illuminated fishing pole having readily serviceable components.

Still another object of this invention is the provision of a fishing pole in which the balance is not materially affected by the illumination means.

Yet another object of the invention is to provide means for increasing the duration of the service life of illumination means for a fishing pole.

Yet still another object of the invention is the provision of an improved device for holding and supporting a fishing pole.

And a further object of the invention is to provide an improved source of illumination for the general use of the fisherman.

Yet a further object of the immediate invention is the provision of a lighted fishing pole holder which is usable on shore or aboard a boat.

And yet a further object of the invention is to provide means for conveniently illuminating a fishing pole from an available remote source of electrical energy.

Yet still a further object of the invention is the provision of improvements according to the above which are usable with pre-existing, commercially available fishing poles.

SUMMARY OF THE INVENTION

Briefly, to achieve the desired objects of the instant invention in accordance with a preferred embodiment thereof, first provided is a fishing pole having an elongate hollow rod fabricated of light transmitting material and extending from an elongate hollow handle. A socket for holding a ball is supported by an end cap removably secured to the butt end of the handle. The bulb directs light to the light receiving end of light conducting means having a light emitting end spaced from the light receiving end. In accordance with a specific embodiment of the invention, the light conducting means is in the form of an optical fiber, or bundle of optical fibers. Preferably, the light emitting ends of the optical fibers are spaced intermediate the fishing line guides spaced along the rod.

In a preferred embodiment of the invention, the bulb is energized by a remote source of electrical energy. Transmission means communicate between the bulb and the remote source of electrical energy. The transmission means includes an electrical connection pair for detachably securing one end of an electrical conductor to the handle of the fishing pole. The other end of the conductor is detachably engagable with the source of electrical energy.

A preferred source of electrical energy is a battery held in a case having securement means for affixing the case to a selected object. The securement means may include a belt for encircling the selected object. In accordance with alternate embodiments, the securement means may take the form of a stake such as can be impaled within the ground or a clamp for attachment to a boat or other object. The case may also include lighting means for providing illumination in the vicinity of the case. In one form, the lighting means includes a bulb located within the case and a light transmitting window forming a part of the case.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings, in which:

FIG. 1 is a perspective view of illuminated fishing tackle, fishing pole and support therefore, embodying the principles of the instant invention;

FIG. 2 is an enlarged fragmentary vertical sectional view taken along the line 2—2 of FIG. 1;

FIG. 3 is an enlarged fragmentary elevation view of the light emitting end of a typical optical fiber as seen in FIG. 2;

FIG. 4 is an enlarged fragmentary perspective view of the handle end of the fishing pole of FIG. 1, the view being partially exploded and partially broken away for purposes of illustration;

FIG. 5 is an enlarged fragmentary perspective view of the upper end of the support of FIG. 1, a portion thereof being broken away to illustrate internal details;

FIG. 6 is an enlarged fragmentary elevation view of the support of FIG. 1, portions thereof being in section;

DESCRIPTION OF THE PREFERRED EMBODIMENTS

Figure 7:
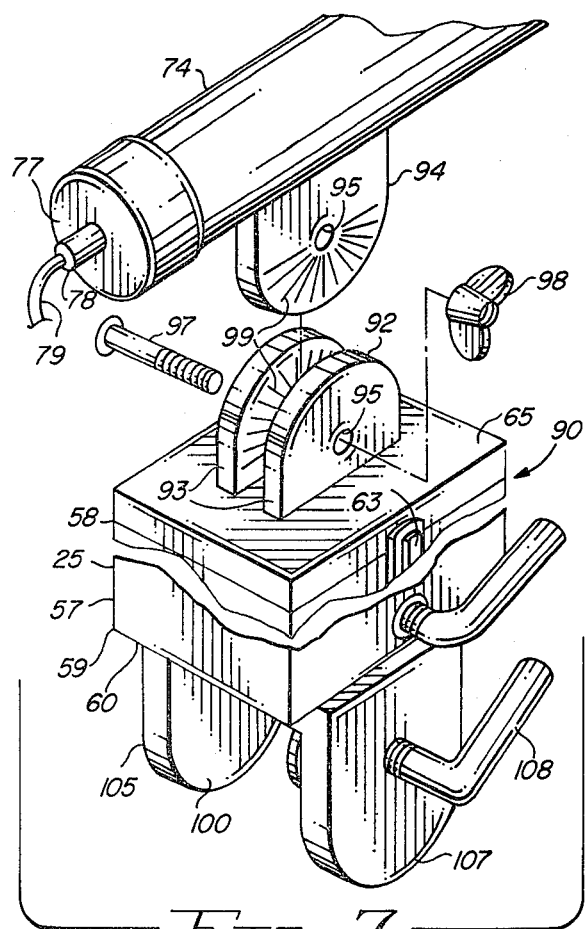
FIG. 7 is a fragmentary, partially exploded, perspective view of an alternate fishing pole support constructed in accordance with the teachings of the instant invention.

Turning now to the drawings in which like reference characters indicate corresponding elements throughout the several views, attention is first directed to FIG. 1 which illustrates a fishing pole, generally designated by the reference character 20, and an apparatus for supporting fishing pole 20, generally designated by the reference character 22, each embodying the principles of the instant invention. Pole 20 generally includes handle 23 and rod 24. Supporting apparatus 22 generally includes caase 25, holder 27 and securement means 28. Throughout the ensuing description, it is to be borne in mind that pole 20 may include numerous commercially available components and that support apparatus 22 may be used in connection with a pole other than the specific pole illustrated.

Fishing pole 20, as further illustrated in FIGS. 2, 3 and 4, is a hollow structure. Handle 23 is fabricated from elongate tubular element 29 having bore 30, forward end 32 and butt end 33. End cap 34, detachably securable to handle 23, includes central portion 35 and securement portion 37 which receives and frictionally engages butt end 33. Rod 24 is fabricated of an elongate hollow shaft 38 have bore 39, fixed end 40 and free end 42. Fixed end 40 of rod 24 is secured to the forward end 32 of handle 23. A plurality of guides 43 are spaced along shaft 38. Fishing line 44, coilable about reel 45 secured to handle 23, extends through guides 43. Shaft 38 is fabricated of a light transmitting material, such as transparent or translucent fiberglass.

Fishing pole structures of the type described are commercially available. Accordingly, the improvements of the instant invention are adaptable to be included in original equipment manufacture or, alternately, as a kit for retrofit to pre-existing commercially available fishing poles.

In accordance with the instant invention, a bundle of optical fibers 47, of a commercially available type, is positioned within bore 39 of shaft 38. The light receiving ends 48 of the several fibers 47 mutually terminate proximate the juncture of the fixed end 40 of shaft 38 and the forward end 32 of tubular element 29. The light emitting ends 49 are spaced at selected locations along rod 24. In a preferred spacing, an end 49 resides intermediate each consecutive pair of guides 43. Such an arrangement, provides a satisfactory visual indicator of the degree of bend or movement of pole 20 to the fisherman during hours of diminished natural light when direct visual observation of the rod 24 is obscured by darkness.

Light normally travels through an optical fiber and is emitted therefrom in a path parallel to the axis of the optical fiber as indicated by the arrowed broken lines A in FIG. 3. Were ends 49 of the optical fibers 47 simply severed, the light would emit therefrom as a point source. For purposes of increasing visibility and providing a greater visual indicator to the fisherman, a portion of the outer surface of each optical fiber 47 adjacent the end 49, as indicated by the bracket B, is removed or scraped away. Along the length of this area, light will be emitted radially outward as indicated by the arrowed lines C.

With particular reference to FIG. 4, it is seen that a conventional lamp socket 50 and lamp bulb 52 are carried by end cap 34. Socket 50 is supported at the free end 53 of extension element 54 extending from cap 34 such that bulb 52 is positioned near the juncture of handle 23 and rod 24 or the light receiving end 48 of the bundle of optical fibers 47. In accordance with one embodiment of the invention, extension element 54 is in the form of a hollow tubular member for receiving and holding one or more conventional flashlight batteries for supplying electrical energy to bulb 52. Such an embodiment would provide a self-contained illuminated fishing pole. However, it is preferred, for purposes of extending the service life or useful duration of the fishing pole, that electrical energy be supplied from a remote source thereof. For this purpose, electrical connection means are carried by handle 23. In the immediately preferred embodiment, the electrical connection means includes receptacle 55, the female element of an electrical connection pair, and wires or other conductor means, not illustrated but as will be known by those skilled in the art, communicating with socket 50.

The previously described elements comprise illumination means for fishing pole 20. The instant invention contemplates various means for supplying electrical energy from a remote source thereof to the illumination means. Such means are an integral part of apparatus 22 which provides other functions as will now be described with reference to FIGS. 1, 5 and 6.

Case 25 is a rigid box-like structure having an upstanding sidewall 57 with upper end 58 and lower end 59. Lower end 59 is closed by bottom 60. Lid 62 is movable between a closed position with upper end 58 and an open position. Lid 62 is secured to case 25 and held in the closed position by a pair of diametrically opposed toggle-type fasteners 63. In the open position, lid 62 is removed from case 25. Alternately, a hinge may be substituted for one of the fasteners 63 in which case lid 62 is permanently secured to case 25 and hingedly moves between the open and the close positions.

Case 25 is sized and shaped to encircle battery 64, which is of the commercially available type generally used as an energy source for lanterns. Battery 64 includes the usual terminals 66 and 67. To dampen vibrations of battery 64 during movement, such as would normally occur when the device is used aboard a boat, lid 62 is provided with tension means 68 which urges battery 64 against bottom 60. Tension means 68, in accordance with the immediately preferred embodiment, includes housing 69 affixed to lid 62 and holding slidably movable plunger 70. Biasing spring 72 urges plunger 70 against battery 64.

Holder 27 is supported by post 73 extending upwardly from lid 62. Holder 27 includes an elongate tubular element 74 having open end 75 for receiving handle 23 therethrough and closed end 77. A plug 78, the male element of the male-female electrical connection pair of which receptacle 55 comprises the female element, is held by closed 77. Electrical conductor means 79 communicates between plug 78 and the terminals 66 and 67 of battery 64 in accordance with standard electrical technique.

Plug 78 is coaxial with tubular element 74. Receptacle 55 is coaxial with tubular element 74. Tubular element 74, which is angularly disposed to lid 62, the size and shape to receive tubular element 29. Accordingly, as handle 23 is positioned within holder 27 and moves toward closed end 77, plug 78 is automatically received within receptacle 55 establishing electrical transmission between battery 64 and bulb 52. In response to the force of gravity, fishing pole 20 is constantly drawn toward closed end 77 thereby maintaining electrical connection.

Support apparatus 22 further includes lighting means for illuminating the general environment in the vicinity thereof for the general convenience of the fisherman. The lighting means includes a socket 80 secured to the inner side of lid 62 and carrying bulb 82. Electrical conductor means, including wires 83, communicate between battery 64 and socket 80 in accordance with conventional practice. A two position, off/on, switch 84 is carried by the conductor means in series between socket 80 and battery 64 for obvious normal reasons of turning bulb 82 off and on. Light from bulb 82 passes through light emitting windows 85 which comprise the upper portion of sidewall 57. Case 25 is readily fabricated of plastic, in which case windows 85 are transparent and the balance of the case is opaque. Alternately, case 25 may be fabricated of metal or other inherently opaque material in which case the windows 85 comprise one or more panes of transparent or translucent plastic or glass held in suitable frames.

Figure 8:
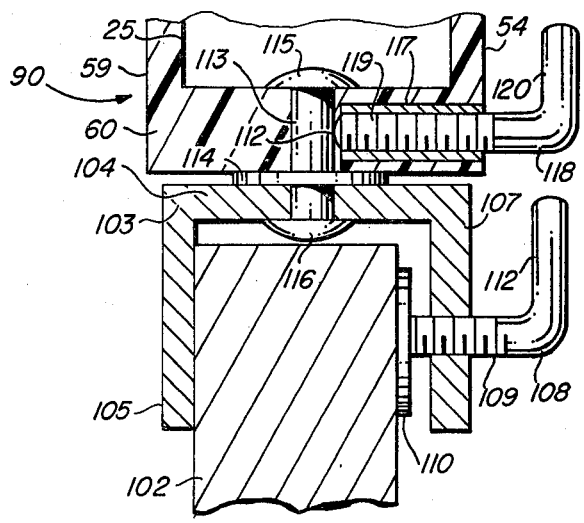
FIG. 8 is an enlarged fragmentary vertical sectional view taken along the axis of the support of FIG. 7 and illustrating same as it would appear when secured to a selected object.

In the embodiment of the support apparatus 22 illustrated in FIGS. 1, 5 and 6, the securement means 28 is in the form of a stake 87 having a pointed end for impaling the ground 88. Holder 27 is rigidly affixed to case 25 at a predetermined angle. The instant invention contemplates that case 25 may be secured to other selected objects and that the holder 27 is adjustably positionable relative case 25. It is further contemplated that the case 25 may be adjustably movable relative the securement means 28. FIGS. 7 and 8 illustrate an alternately preferred embodiment, generally designated by the reference character 90, especially adapted to be secured to an upright object such as the transom or gunwale of a boat.

In general similarity to the previously described embodiment, support apparatus 90 includes case 25 having sidewall 57 with upper and lower ends 58 and 59, respectively. Bottom 60 is carried at lower end 59 and lid 62 is held against the upper end 58 by fastener 63. Further common elements includes handle holding tubular element 74 with closed end 77 supporting plug 78. Other structure and function of these components are as previously described.

Instead of post 73, however, a bifurcated bracket 92 having spaced apart furcations 93 extends upwardly from lid 62. Ear 94, depending from tubular element 74, is movably received between furcations 93. The substantially horizonal bore 95 extends through bracket 92 and ear 94. Bolt 97, receivable through bore 95 and threadedly engagable with wing nut 98, forms a pivotal axis for vertical angular adjustment of the fishing pole relative ground level. Mating serrations 99, carried by furcations 93 and ear 94, engage to retain tubular element 74 at the desired slope when furcations 93 are brought into clamping action with ear 94 in response to the tightening of wing nut 98.

Provisions are also made for horizontal angular adjustment of the fishing pole about a substantially vertical axis. In the immediately preferred embodiment, support apparatus 90 is provided with alternate securement means 100 securable to a selected object herein illustrated as the transom or gunwale 102 of a boat. The upper edges of other objects, such as walls, fences, partitions, etc. are considered analogous. Securement means 100, which is especially adapted for gripping the selected object, includes an inverted generally U-shaped element 103 having an intermediate section 104 from which depends a pair spaced apart legs 105 and 107. Leg 105 functions as a fixed jaw for abutting the object. A movable jaw 108 is carried by leg 107. Movable jaw 108 includes threaded shank 109 threadedly engaged with leg 107 terminating at the inner end with foot 110 and at the outer end with handle 112. Foot 110, which opposes fixed jaw 105, is movable in response to rotation of handle 112 in well known clamp fashion.

Pin 113, extending through appropriately sized bores in bottom 60 and intermediate section 104, provides a pivot for rotation of case 25 relative securement means 100 about a substantially vertical axis. Thrust washer 114 resides between bottom 60 and intermediate section 104. Ends 115 and 116 of pin 113 are upset or peened over to prevent separation of case 25 from securement means 100.

Locking means are provided for maintaining case 25 at the selected angular adjustment relative securement means 100. Assuming case 25 is fabricated of plastic, the preferred embodiment of the locking means includes an internally threaded sleeve 117 inserted into bottom 60. Detent 118 includes a threaded shaft 119 engaged within sleeve 117 and a handle 120. In response to rotation of handle 120, end 122 of shank 119 is frictionally secured against, or alternately removed from, pin 113. In the immediate embodiment, it is assumed that pin 113 is nonrotatable within securement means 100, being secured thereto by any convenient means such as a selected adhesive, locking pin or set screw. The immediate embodiment may also include lighting means as previously described.

Figure 9:
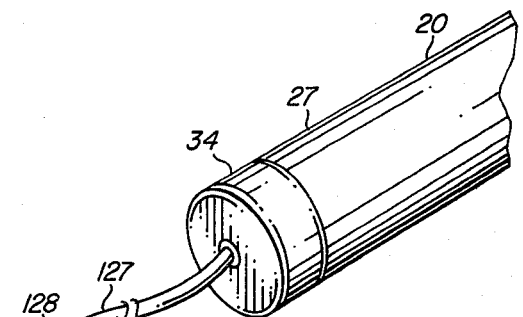
FIG. 9 is a fragmentary perspective view of the butt end of the handle of the fishing pole of FIG. 1 as it would appear in combination with a remote source of electrical energy.

FIG. 9 illustrates alternate means for supplying electrical energy from a remote source thereof to fishing pole 20. Permanently associated with socket 50 is electrical conductor 127 which projects through end cap 34 and terminates with an element 128 of an electrical connection pair. A second conductor 129, an extension cord having a length selected in accordance with the immediate need, communicates between the source of electrical energy and the first conductor 127. Second conductor 129 terminates at a first end 130 with a complemental element 132 of the electrical connection pair and at the second end 133 with connection means for attachment to the source of electrical energy. In the immediate embodiment, the source of electrical energy is illustrated as battery 64 and the connection means are in the form of clips 134 and 135 which connect two terminals 66 and 67, respectively. Battery 64, as depicted herein, is considered to represent any immediately available battery, such as the battery of a boat or car or a battery especially provided for the purpose.

Figure 11:
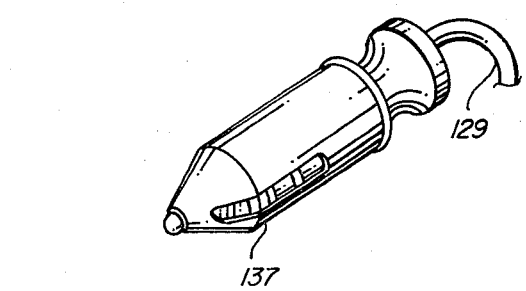
FIG. 11 is a perspective view of electrical connection means useful in connection with the embodiment of the invention as seen in FIG. 9.

Boats, cars and other vehicles are frequently provided with cigarette lighters. The socket of the cigarette lighter, being connected to the battery, provides a source of electrical energy. FIG. 11 illustrates a conventional commercially available plug 137 of the type insertable into a cigarette lighter and normally supplied with trouble lights and other electrical vehicle accessories. Plug 137 is readily securable to extension cord 129 in place of clips 134 and 135.

Figure 10:
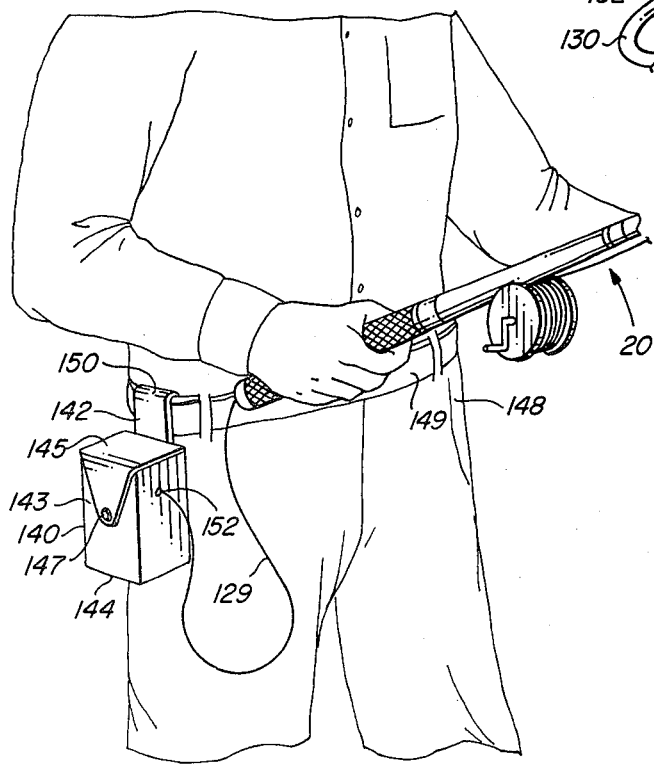
FIG. 10 is a fragmentary perspective view of the torso of a fisherman, as he would appear utilizing the fishing pole of FIG. 1 in combination with an alternate embodiment of means for illuminating the fishing pole.

The previously described support apparatus 22 and 90 are especially adapted for situations in which the fisherman is not in immediate physical possession of the fishing pole, such as still fishing or trolling. FIG. 10 illustrates yet another embodiment of the invention especially adapted for use when the fisherman is holding the pole such as during bait casting. In general analogy to the previously described apparatus, the immediate embodiment includes case 140 for holding a battery of selected size and shape, such as battery 64, and securement means 142 for securement to a selected object. Case 140 is in the form of a pouch, such as may be fabricated of canvas or other heavy cloth, having an upright sidewall 143 for encircling the battery, a bottom 144 upon which the battery rests, and a lid 145 in the form of a hinged flap which is secured to sidewall 143 by conventional snap fastener 147. The selected object, in the immediate case, is the torso 148 of the fisherman. The securement means 142 includes belt 149, which encircles the torso 148, and loop 150 extending from case 140 and encircling belt 149. Conductor 129 projects through opening 152 in sidewall 143 and is connected with battery and fishing pole 20 as previously described.

Various modifications and alternations to the embodiments herein chosen for purposes of illustration will readily occur to those skilled in the art. To the extent that such modifications and variations do not depart from the spirit of the invention, they are intended to be included within the scope thereof which is accessed only by a fair interpretation of the following claims.

Having fully described and disclosed the present invention and alternately preferred embodiments thereof in such clear and concise terms as to enable those skilled in the art to understand and practice the same, the invention claimed is:

1. In a fishing pole including an elongate hollow rod fabricated of light transmitting material and having free and fixed ends, and a plurality of guides spaced between said ends, and an elongate hollow handle having a forward end secured to the fixed end of said rod, and a butt end, improvements therein for illumination of said rod and for convenient servicing of components, said improvements comprising:
   (a) a bundle of fiber optics, each said fiber optic having:
      i. a light receiving end proximate the fixed end of said rod; and
      ii. a light emitting end spaced at a selected location along said rod; and
   (b) lighting means for directing light to the light receiving end of each said fiber optic.

2. The improvements of claim 1, wherein said lighting means includes:
   (a) an end cap removably secured to the butt end of said handle; and
   (b) a socket supported by said end cap for holding a bulb.

3. The improvements of claim 2, further including connection means carried by said end cap for detachable engagement of a remote power source for energizing said bulb.

4. The improvements of claim 3, further including an extension element intermediate said end cap and said socket for positioning said bulb proximate the light receiving end of said light conducting means.

5. The improvements of claim 2, further including a battery case intermediate said end cap and said socket for containing a battery for energizing said bulb.

6. The improvements of claim 2, wherein said end cap includes a securement portion for receiving and frictionally engaging the butt end of said handle.

7. The improvements of claim 1, wherein each said fiber optic is treated along a portion thereof adjacent the light emitting end to emit light therefrom.

8. The improvements of claim 1, wherein the light emitting end of each said fiber optic is spaced intermediate a selected pair of consecutive ones of said plurality of guides.

9. The improvements of claim 8, wherein the light emitting end of each of said fiber optics is spaced proximate the mid-point between said selected pair of consecutive ones of said plurality of guides.

10. An apparatus for securement to a selected object and for supporting a fishing pole, which fishing pole includes an elongate handle having a forward end and a butt end, and elongate rod extending from the forward end of said handle, and for providing illumination in the vicinity of said fishing pole, said apparatus comprising:
 (a) a case;
 (b) lighting means carried by said case for producing illumination;
 (c) securement means carried by said case for affixation to a selected object; and
 (d) holder means carried by said case for receiving and supporting said fishing pole said holder means including an elongate tubular element having an open end for receiving the handle of said fishing pole therethrough and a closed end for receiving the butt end of said handle thereagainst.

11. In a fishing pole including a handle having a forward end and a butt end, an elongate rod extending from the forward end of said handle, and illumination means for lighting said fishing pole, improvements therein for energizing said illumination means and for increasing the operative duration of said illumination means, said improvements comprising:
 (a) a source of electrical energy remote from said handle, elongate rod, and illumination means; and
 (b) transmission means for transmitting electrical energy from said source thereof to said illumination means.

12. The improvements of claim 11, wherein said transmission means includes:
 (a) an element of an electrical connection pair carried by said handle and communicating with said illumination means; and
 (b) an electrical conductor including
  i. a first end having a complemental element of said electrical connection pair, and
  ii. a second end having connection means for attachment to said source of electrical energy.

13. The improvements of claim 12, wherein:
 (a) said source of electrical energy remote from said fishing pole includes:
  i. a battery, and
  ii. a receptacle energized by said battery; and
 (b) said connection means includes a plug receivable in electrical connection within said receptacle.

14. The improvements of claim 12, wherein said source of electrical energy is in the form of a battery positioned remotely from said fishing pole.

15. The improvements of claim 14, further including:
 (a) a case for holding said battery; and
 (b) securement means carried by said case for affixation to a selected object.

16. The improvements of claim 15, wherein said securement means includes a belt for encircling said selected object.

17. The improvements of claim 15, wherein said securement means includes a clamp for gripping said selected object.

18. The improvements of claim 15, wherein said securement means includes a stake for impaling said object.

19. The improvements of claim 18, further including holder means carried by said case for receiving and supporting said fishing pole.

20. The improvements of claim 19, wherein said holder is adjustably positionable about a substantially horizontal axis relative to said case.

21. The improvements of claim 19, wherein said holder is adjustably positionable about a substantially vertical axis relative to said securement means.

22. The improvements of claim 19, wherein said complemental element of said electrical connection pair is connectable with said element of said electrical connection pair in response to said fishing pole being received within said holder.

23. In a fishing pole including a handle having a forward end and a butt end, an elongate rod extending from the forward end of said handle, and illumination means for lighting said fishing pole, improvements therein for energizing said illumination means and for increasing the operative duration of said illumination means, said improvements comprising:
 (a) a battery remote from said handle, said elongate rod, and said illumination means; and
 (b) transmission means for transmitting electrical energy from said source thereof to said illumination means, said transmission means including
  i. an element of an electrical connection pair carried by said handle and communicating with said illumination means; and
  ii. an electrical conductor including a first end having a complemental element of said electrical connection pair, and a second end having connection means for attachement to said battery;
 (c) a case for holding said battery;
 (d) securement means carried by said case for affixation to a selected object;
 (e) holder means carried by said case for receiving and supporting said fishing pole, said holder including an elongate tubular element having
  i. an open end for receiving the handle of said fishing pole therethrough; and
  ii. a closed end,
 said complemental element of said electrical connection pair includes a male element projecting axially from the closed end of said holder; and
 said element of said electrical connection pair includes a female element axially carried in the butt end of said fishing pole for receiving said male element.

24. The improvements of claim 23, wherein said case includes:
 (a) a sidewall for encircling said battery and having upper and lower ends;
 (b) a lid carried at the upper end of said sidewall and movable between an open position and a closed position;
 (c) a bottom affixed to the lower edge of said sidewall for receiving said battery thereon; and
 (d) tension means for biasing said battery toward said bottom when said lid is in said closed position.

25. The improvements of claim 24, wherein said tension means includes a spring biased plunger engagable against said battery as said lid is moved to said closed position.

26. The improvements of claim 23, further including lighting means carried by said case for illumination in the vicinity of said case.

27. The improvements of claim 26, wherein said lighting means includes:
(a) a socket carried by said case for holding a lamp bulb;
(b) electrical conductor means communicating between said battery and said socket; and
(c) switch means carried by said conductor means in series between said battery and said socket.

28. The improvements of claim 27, wherein:
(a) said socket is carried within said case; and
(b) said case includes a light transmitting window.

29. An apparatus for securement to a selected object and for supporting a fishing pole, which fishing pole includes
an elongate handle having a forward end and a butt end, and
an elongate rod extending from the forward end of said handle,
and for providing illumination in the vicinity of said fishing pole, said apparatus comprising:
(a) a case;
(b) lighting means carried by said case for producing illumination;
(c) securement means carried by said case for affixation to a selected object; and
(d) holder means carried by said case for receiving and supporting said fishing pole.

30. The apparatus of claim 29, wherein said securement means includes a clamp for gripping said selected object.

31. The apparatus of claim 29, wherein said securement means includes a stake for impaling said object.

32. The apparatus of claim 29, wherein said holder means is adjustably positionable about a substantially horizontal axis relative said case.

33. The apparatus of claim 29, wherein said holder means is adjustably positionable about a substantially vertical axis relative said securement means.

34. The apparatus of claim 29, wherein said lighting means includes:
(a) a battery carried within said case;
(b) a socket carried by said case for holding a lamp bulb;
(c) electrical conductor means communicating between said battery and said socket; and
(d) switch means carried by said conductor means in series between said battery and said socket.

35. The apparatus of claim 34, wherein
(a) said socket is positioned within said case; and
(b) said case includes a light transmitting window.

36. The apparatus of claim 35, wherein said case includes:
(a) a sidewall for encircling said battery and having upper and lower ends;
(b) a lid affixable to the upper end of said sidewall and movable between an open position and a closed position;
(c) a bottom affixed to the lower edge of sidewall for receiving said battery thereon; and
(d) tension means for biasing said battery toward said bottom when said lid is in said closed position.

37. The apparatus of claim 36, wherein said tension means includes a spring biased plunger engagable against said battery as said lid is moved to said closed position.

* * * * *